US012774138B2

(12) United States Patent
Yamanaka et al.

(10) Patent No.: US 12,774,138 B2
(45) Date of Patent: Oct. 27, 2026

(54) TIN-PLATED STEEL SHEET AND CAN

(71) Applicant: NIPPON STEEL CORPORATION, Tokyo (JP)

(72) Inventors: Shintaro Yamanaka, Tokyo (JP); Makoto Kawabata, Tokyo (JP); Hiroaki Ando, Tokyo (JP); Yasuhiko Sato, Tokyo (JP); Koichi Noguchi, Tokyo (JP); Akihiro Jinno, Tokyo (JP)

(73) Assignee: NIPPON STEEL CORPORATION, Tokyo (JP)

( * ) Notice: Subject to any disclaimer, the term of this patent is extended or adjusted under 35 U.S.C. 154(b) by 143 days.

(21) Appl. No.: 18/867,519

(22) PCT Filed: Jun. 16, 2023

(86) PCT No.: PCT/JP2023/022424
§ 371 (c)(1),
(2) Date: Nov. 20, 2024

(87) PCT Pub. No.: WO2023/243717
PCT Pub. Date: Dec. 21, 2023

(65) Prior Publication Data
US 2025/0382114 A1 Dec. 18, 2025

(30) Foreign Application Priority Data
Jun. 17, 2022 (JP) ................................ 2022-098082

(51) Int. Cl.
*B65D 17/00* (2006.01)
*B32B 15/01* (2006.01)
(Continued)

(52) U.S. Cl.
CPC ............ *B65D 65/40* (2013.01); *B32B 15/013* (2013.01); *B65D 17/02* (2013.01);
(Continued)

(58) Field of Classification Search
CPC ... B23B 2311/16; C23C 28/34; C23C 28/345; C25D 9/08
See application file for complete search history.

(56) References Cited

U.S. PATENT DOCUMENTS 4,999,258 A 3/1991 Wake et al.
2020/0040479 A1 2/2020 Yamanaka et al.

FOREIGN PATENT DOCUMENTS

EP 1518944 A1 3/2005
EP 3508617 A1 7/2019
(Continued)

*Primary Examiner* — Adam Krupicka
(74) *Attorney, Agent, or Firm* — Renner, Otto, Boisselle & Sklar LLP

(57) ABSTRACT

Provided is a tin-plated steel sheet which is more excellent in yellowing resistance in a steel sheet for containers having a film layer containing zirconium without being subjected to a conventional chromate treatment. A tin-plated steel sheet is adopted which has a steel sheet, a tin plating layer located on at least one surface of the steel sheet, and a film layer located on the tin plating layer and containing zirconium oxide and tin sulfide, in which an adhesion amount of the tin-based plating layer is 0.1 g/m$^2$ or more and 15 g/m$^2$ or less in terms of the amount of metal Sn, an adhesion amount of the zirconium oxide in the film layer is 0.2 mg/m$^2$ or more and 50 mg/m$^2$ or less in terms of the amount of metal Zr, and an adhesion amount of the tin sulfide is 0.1 mg/m$^2$ or more and 5 mg/m$^2$ or less in terms of the amount of sulfur.

4 Claims, 2 Drawing Sheets

(51) Int. Cl.
*B65D 65/40* (2006.01)
*C23C 28/00* (2006.01)

(52) U.S. Cl.
CPC ..... *B32B 2255/06* (2013.01); *B32B 2255/205* (2013.01); *B32B 2311/16* (2013.01); *B32B 2311/30* (2013.01); *B32B 2439/66* (2013.01); *C23C 28/3455* (2013.01)

(56) References Cited

FOREIGN PATENT DOCUMENTS

| | | | |
|---|---|---|---|
| JP | 63-290292 | A | 11/1988 |
| JP | 2004-060052 | A | 2/2004 |
| JP | 2007-284789 | A | 11/2007 |
| JP | 2010-013728 | A | 1/2010 |
| JP | 2010-261055 | A | 11/2010 |
| JP | 2011-174172 | A | 9/2011 |
| TW | 201842237 | A | 12/2018 |

TIN-PLATED STEEL SHEET AND CAN

TECHNICAL FIELD OF THE INVENTION

The present invention relates to a tin-plated steel sheet and a can.

The present application claims priority based on Japanese Patent Application No. 2022-098082 filed in Japan on Jun. 17, 2022, the contents of which are incorporated herein by reference.

RELATED ART

Tin-plated steel sheets are well known as "tinplates" and are widely used in cans for storing beverages and foods and other food-related applications. This is because tin is safe for the human body and is a beautiful metal.

This tin-plated steel sheet is mainly manufactured by an electroplating method. This is because the electroplating method is more advantageous than a hot-dip plating method in order to control the amount of tin used, which is a relatively expensive metal, to the minimum necessary amount. That is, the tin-plated steel sheet is manufactured by forming a tin plating layer having beautiful metallic gloss on the surface of the steel sheet by performing electroplating treatment, or electroplating treatment and heating and melting treatment. Further, a chromate film is often applied on the tin plating layer of the tin-plated steel sheet by subjecting the tin-plated steel sheet to chromate treatment such as electrolysis treatment or immersion treatment using a solution of hexavalent chromate.

Examples of the effect of the chromate film include prevention of sulfidation blackening of the tin plating layer, prevention of yellowing of the tin plating layer, prevention of deterioration of coating film adhesion, and the like. Sulfidation blackening of the tin plating layer is a phenomenon in which S (sulfur) in the content of the can reacts with tin (Sn) or iron (Fe) contained in the tin plating layer to form black sulfide, and it is possible to prevent sulfidation blackening by forming a chromate film. Also, yellowing of the tin plating layer is a phenomenon caused by the progress of oxidation of the surface of the tin plating layer, and the yellowing of the tin plating layer is suppressed by forming a chromate film. Further, deterioration of coating film adhesion is a phenomenon caused by cohesive fracture of tin oxide when a tin plating layer is coated and used, and by forming a chromate film between the tin plating layer and the coating film, deterioration of coating film adhesion is prevented.

On the other hand, in recent years, due to the increase in environmental and safety awareness, it is required that the final product does not contain hexavalent chromium, and further, it is required that the chromate treatment itself is not performed. However, in the tin-plated steel sheet on which the chromate film is not formed, as described above, sulfide staining resistance is reduced, the external appearance is yellowed due to growth of tin oxide, or the coating film adhesion is reduced.

For this reason, some tin-plated steel sheets subjected to a film coating treatment instead of the chromate film have been proposed.

For example, Patent Document 1 below proposes a tin-plated steel sheet in which a film containing P and Si is formed by a treatment using a solution containing phosphate ions and a silane coupling agent.

Also, Patent Document 2 below proposes a tin-plated steel sheet in which a film containing a reactant of Al and P, at least one of Ni, Co, and Cu, and a silane coupling agent is formed by a treatment using a solution containing aluminum phosphate.

In addition, Patent Document 3 below proposes a method for manufacturing a tin-plated steel sheet not having a chromate film, in which Zn plating is performed on tin plating, and then heat treatment is performed until the Zn single plating layer disappears.

Further, in Patent Documents 4 and 5 below, a steel sheet for containers having a chemical conversion film containing zirconium, phosphoric acid, a phenol resin, and the like is proposed.

CITATION LIST

Patent Document

Patent Document 1: Japanese Unexamined Patent Application, First Publication No. 2004-60052

Patent Document 2: Japanese Unexamined Patent Application, First Publication No. 2011-174172

Patent Document 3: Japanese Unexamined Patent Application, First Publication No. S63-290292

Patent Document 4: Japanese Unexamined Patent Application, First Publication No. 2007-284789

Patent Document 5: Japanese Unexamined Patent Application, First Publication No. 2010-13728

SUMMARY OF INVENTION

Problems to be Solved by the Invention

However, in the tin-plated steel sheets and the method for manufacturing the same proposed in Patent Documents 1 to 5, formation of black sulfide with time and growth of tin oxide cannot be sufficiently suppressed, and there is a problem that the tin-plated steel sheet is poor in sulfide staining resistance and yellowing resistance.

Therefore, the present invention has been made in view of the above problems, and an object of the present invention is to provide a tin-plated steel sheet and a can which are more excellent in sulfide staining resistance and yellowing resistance without being subjected to a conventional chromate treatment.

Means for Solving the Problem

In order to solve the above problems, as a result of intensive studies by the present inventors, it has been found that a tin-plated steel sheet which is more excellent in yellowing resistance without performing a chromate treatment can be realized by forming a film containing zirconium oxide and tin sulfide on the surface of the tin-plated steel sheet.

The gist of the present invention completed based on the above findings is as follows.

(1) A tin-plated steel sheet including:

a steel sheet;

a tin-based plating layer located on at least one surface of the steel sheet; and a film layer located on the tin-based plating layer and containing zirconium oxide and tin sulfide, in which an adhesion amount of the tin-based plating layer is 0.1 $g/m^2$ or more and 15 $g/m^2$ or less in terms of the amount of metal Sn, an adhesion amount of the zirconium oxide in the film layer is 0.2 $mg/m^2$ or more and 50 $mg/m^2$ or less in terms of the amount of metal Zr, and an adhesion amount of the tin sulfide is 0.1 $mg/m^2$ or more and 5 $mg/m^2$ or less in terms of the amount of sulfur.

(2) The tin-plated steel sheet according to (1), in which the tin sulfide is SnS.

(3) A can made of the tin-plated steel sheet according to (1) or (2).

The tin sulfide is preferably present in a layer on the surface of the film layer.

In addition, it is preferable that the tin sulfide is dispersed and present inside the film layer.

Further, it is preferable that the tin sulfide is dispersed inside the film layer and is present in a layer on the surface of the film layer.

Effects of the Invention

According to the present invention, it is possible to provide a tin-plated steel sheet and a can which are more excellent in sulfide staining resistance and yellowing resistance without being subjected to a conventional chromate treatment.

EMBODIMENTS OF THE INVENTION

Hereinafter, a preferred embodiment of the present invention will be described in detail.

The present invention described below relates to a tin-plated steel sheet that is widely used for can applications for storing foods, beverages, and the like. More specifically, the present invention relates to a tin-plated steel sheet and a can which are more excellent in sulfide staining resistance and yellowing resistance without being subjected to a conventional chromate treatment.

<1. Tin-Plated Steel Sheet>

Figure 1:
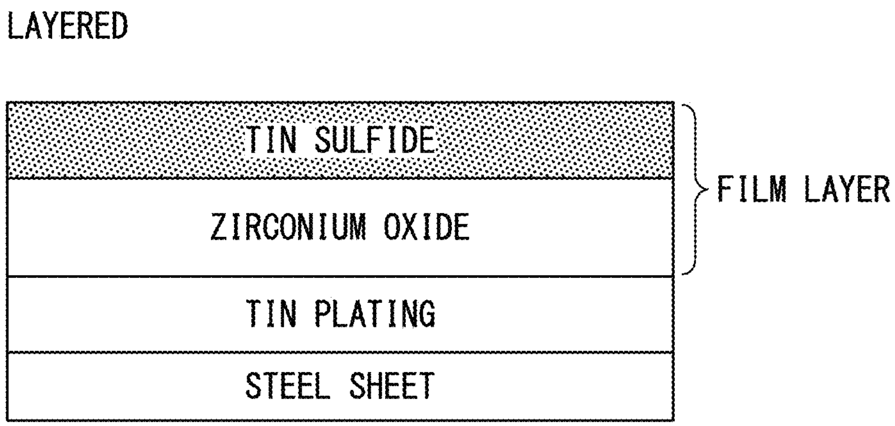
FIG. 1 is a schematic cross-sectional view of a tin-plated steel sheet according to an embodiment of the present invention, in which zirconium oxide and tin sulfide are formed in layers.
Figure 2:
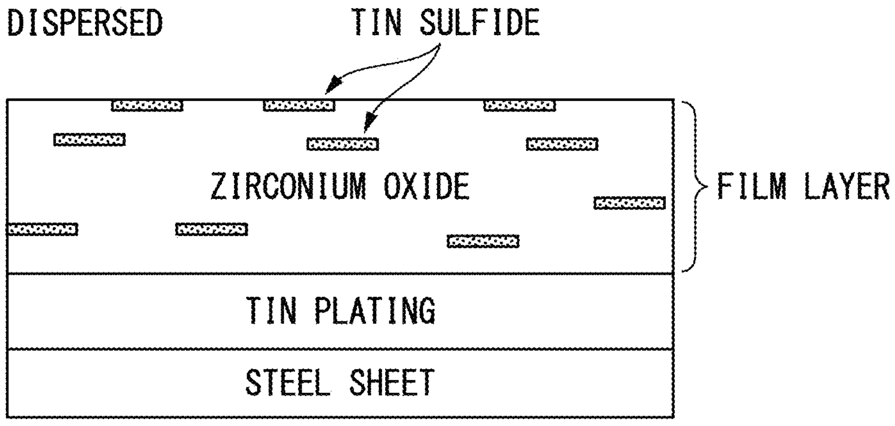
FIG. 2 is a schematic cross-sectional view of a tin-plated steel sheet according to an embodiment of the present invention formed by mixing zirconium oxide and tin sulfide.
Figure 3:
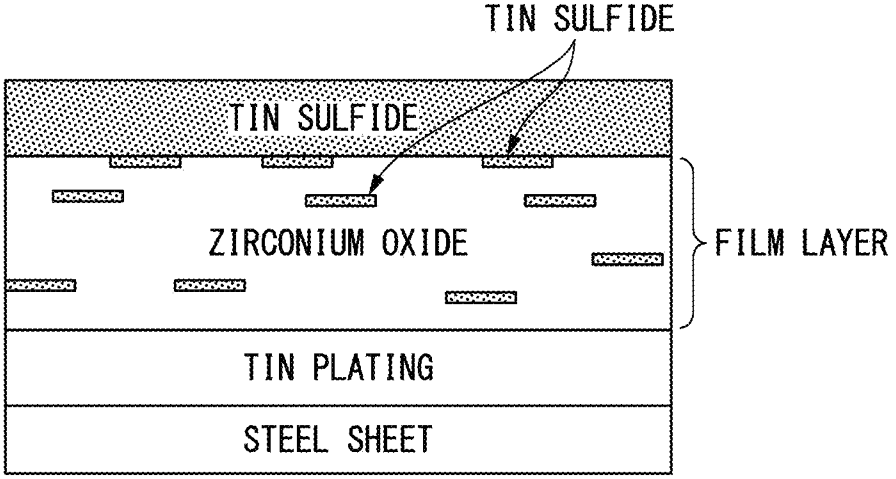
FIG. 3 is a schematic cross-sectional view of a tin-plated steel sheet according to an embodiment of the present invention formed by mixing zirconium oxide and tin sulfide, in which tin sulfide is formed in a layer.

As shown in FIGS. 1 to 3, a tin-plated steel sheet according to the present embodiment has a steel sheet, a tin-based plating layer formed on at least one surface of the steel sheet, and a film layer formed on a surface of the tin-based plating layer and containing a predetermined amount of zirconium oxide and tin sulfide.

(1.1 Steel Sheet)

The steel sheet used as the base metal of the tin-plated steel sheet according to the present embodiment is not particularly limited, and any steel sheet can be used as long as it is a steel sheet used for a tin-plated steel sheet for a general container. Examples of such a steel sheet include a low carbon steel sheet, an ultra low carbon steel sheet, and the like.

(1.2 Tin-Based Plating Layer)

Tin plating is applied to at least one surface or both surfaces of the steel sheet as described above to form a tin-based plating layer. Such a tin-based plating layer improves corrosion resistance of the steel sheet. The "tin-based plating layer" in the present specification includes not only a plating layer made of metal tin but also a layer in which impurities are mixed in metal tin and a layer in which a trace element is contained in metal tin.

That is, the tin-based plating layer contains 90.0 mass % or more of tin (Sn) and balance impurities. In addition, the tin-based plating layer may include 90.0 mass % or more of tin (Sn) and balance impurities. In this case, the content of tin contained in the tin-based plating layer may be 95.0 mass % or more, 98.0% or more, 99.0 mass % or more, 99.5 mass % or more, or 99.9 mass % or more. Further, in addition to tin and impurities, a trace amount of an alloying element may be contained.

Also, the tin-based plating layer may contain more than 50.0 mass % of tin (Sn), 0 to 20 mass % of Fe, and balance impurities. In addition, the tin-based plating layer may include more than 50.0 mass % of tin (Sn), 0 to 20 mass % of Fe, and balance impurities. Further, in addition to tin, Fe, and impurities, a trace amount of an alloying element may be contained. As described above, the tin-based plating layer containing tin and Fe is composed of an Fe-tin alloy. Moreover, the tin-based plating layer may have a single-layer structure of an Fe-tin alloy layer, or may have a two-layer structure of an Fe-tin alloy layer and a tin layer laminated on the Fe-tin alloy layer. In this case, the thickness ratio of the tin layer to the iron-tin alloy layer is not particularly limited.

As described above, the tin-based plating layer can take various forms, but it is sufficient that the adhesion amount as the amount of metal tin described below is secured in the entire tin-based plating layer, and limitation of the chemical composition of the tin-based plating layer is not essential in the present invention.

In the tin-based plating layer according to the present embodiment, the adhesion amount of the tin-based plating layer per one surface is not particularly limited, but for example, it can be set to 0.1 $g/m^2$ or more and 15 $g/m^2$ or less, and preferably 1.0 $g/m^2$ or more and 10 $g/m^2$ or less as the amount of metal tin. When the adhesion amount per one surface of the tin-based plating layer is 0.1 $g/m^2$ or more in terms of tin, corrosion resistance can be sufficiently excellent. Also, when the adhesion amount per one surface of the tin-based plating layer is 15 $g/m^2$ or less in terms of tin, it is possible to sufficiently obtain the effect of improving corrosion resistance by tin while suppressing a decrease in adhesion and an increase in cost. The lower limit of the adhesion amount of the tin-based plating layer per one surface is preferably 1.0 $g/m^2$ or more, and further preferably 2.0 $g/m^2$ or more, or 2.5 $g/m^2$ or more as the amount of metal tin. The upper limit of the adhesion amount of the tin-based plating layer per one surface is preferably 10 $g/m^2$ or less, and further preferably 5.0 $g/m^2$ or less, 4.0 $g/m^2$ or less, 3.5 $g/m^2$ or less, or 3.0 $g/m^2$ or less as the amount of metal tin.

Here, the adhesion amount of tin per one surface is, for example, a value measured by an electrolytic peeling method or fluorescent X-ray spectroscopy described in JIS G 3303:2017. When the adhesion amount is measured by fluorescent X-ray spectroscopy, the fluorescent X-ray used for the measurement is a primary ray of Sn$\alpha$K (wavelength 0.0492 nm). The target of the X-ray tube is Rh, and the tube voltage and tube current are appropriate values in the range of 30 to 40 kV and 80 to 100 mA, respectively. For the slit width, the dispersive crystal, and the detector, conditions suitable for the resolution of the fluorescent X-ray to be measured and the tin adhesion amount range are selected. Also, a calibration curve is prepared by the fluorescent X-ray intensity from a test piece in which the adhesion amount of tin is known. Then, the tin-based plating layer to be measured is irradiated with X-rays according to the set conditions, and the fluorescent X-ray intensity is measured. Subsequently, the adhesion amount of tin in the tin-based plating layer is determined from the fluorescent X-ray intensity by the calibration curve. In addition, the measurement points are circular areas with a diameter of 30 mm on the surface of the film layer, measurement is performed at arbitrary 5 measurement points on the surface of the film layer, and an arithmetic average value thereof is taken as the measurement result.

In measuring the adhesion amount of tin in the tin-based plating layer, it is not necessary to remove the film layer, and the adhesion amount of tin can be measured directly from the surface of the film layer by fluorescent X-rays in a state where the film layer is present.

In order to obtain the adhesion amount of iron in the tin-based plating layer (the amount of iron in the tin-iron alloy layer), an electrolytic peeling method (constant current electrolysis method) is used. Specifically, the following method is used. A tin-plated steel sheet is cut into a test piece having a size of 20 mm×50 mm, and then, a portion of the surface other than the measurement area of 4 $cm^2$, that is, a portion including the portion of the surface other than the measurement area and the entire surface on the opposite side of the surface is tape-sealed. Thereafter, the tin-plated steel sheet is immersed in hydrochloric acid at 1 mol/L, 150 mL, and 25° C., an anode current of 0.02 A with respect to 4 $cm^2$ is applied to the tin-plated steel sheet while a Pt sheet is used as a counter electrode and a silver/silver chloride electrode (saturated KCl) is used as a reference electrode, and the tin-based plating is melted while measuring a potential at that time. A region (A) in which the potential of the tin-plated steel sheet to the silver/silver chloride electrode (saturated KCl) is −0.4 V or less in a time region from the start of measurement is a time region in which non-alloyed tin is detected, a region (B) in which the potential is more than −0.4 V and −0.3 V or less is a time region in which tin-plating containing iron (tin-iron alloy layer) is detected, and a region in which the potential is more than −0.3 V is a time region in which a base steel sheet portion is detected. The length of the region (B) (time T(B) (sec)) is measured, and the amount of tin ($g/m^2$) constituting the tin-iron alloy layer is determined from the following formula.

$$\text{Amount of tin } (g/m^2)=\{118.7\times0.02\times T(B)/(96500\times2)\}\times2500$$

From the amount of tin, the amount of iron in the plating layer is determined by the following formula.

$$\text{Amount of iron } (g/m^2)=[\text{Amount of tin}]\times55.85/293.25$$

The above measurement is performed at arbitrary five points of the tin-based plating layer, and an arithmetic average thereof is taken as the amount of iron.

(1.3 Film Layer Containing Zirconium Oxide and Tin Sulfide)

The tin-plated steel sheet according to the present embodiment has a film layer containing zirconium oxide and tin sulfide on the surface of the steel sheet having the tin-based plating layer as described above. The film layer may contain a substance other than zirconium oxide and tin sulfide, for example, a compound containing P (phosphorus) or a compound containing F (fluorine) as long as the effect of the present invention is not impaired. Also, the content of the organic component in the film layer is preferably 0.1 mass % or less. In the present embodiment, an organic component such as a polymer compound or an organic compound is not intentionally added, and may be inevitably contained as long as the effect of the present invention is not inhibited. The film layer may contain various substances other than zirconium oxide and tin sulfide as described above, but it is sufficient that the Zr adhesion amount and the amount of sulfur described below are secured in the entire film layer, and limitation of the components of the film layer is not essential in the present invention By forming the zirconium oxide and the tin sulfide as described above on the surface of the tin-plated steel sheet, the yellowing resistance can be further improved. The reason for this is not clear, but is considered as follows by the detailed investigation of the present inventors.

A conventional film containing zirconium oxide as described in, for example, Patent Document 4 or Patent Document 5 is formed on a tin-plated surface by utilizing an increase in pH associated with hydrogen generation from the tin-plated surface by cathode electrolysis. However, since the film containing zirconium oxide formed by this method is in a relatively rough state, the film easily transmits oxygen, and the tin-plated surface is oxidized and easily turns yellow. In addition, the film containing zirconium oxide contains tin slightly, and yellowing due to oxidation of the tin also occurs.

Therefore, the present inventors have attempted to improve the yellowing resistance of a conventional film containing zirconium oxide, and have found that by forming a film containing zirconium oxide and tin sulfide on a tin-plated steel sheet, the growth of tin oxide can be suppressed, and the yellowing resistance can be improved. This is presumed to be because (A) the tin sulfide itself has an excellent barrier property against oxygen transmission, and (B) zirconium oxide and tin sulfide coexist to increase denseness of the film, thereby improving the barrier property against oxygen transmission.

The adhesion amount of the zirconium oxide needs to be 0.2 $mg/m^2$ or more and 50 $mg/m^2$ or less in terms of the amount of metal Zr. If the adhesion amount is less than 0.2 $mg/m^2$, the steel sheet is poor in sulfide staining resistance, and if it exceeds 50 $mg/m^2$, the steel sheet is poor in coating film adhesion. A preferable range is 0.5 $mg/m^2$ or more and 25 $mg/m^2$ or less, and a more preferable range is 1.0 $mg/m^2$ or more and 10 $mg/m^2$ or less.

For the adhesion amount of Zr, X-ray fluorescence measurement is performed on the tin-plated steel sheet having the film layer according to the present embodiment formed on the surface, and the value obtained from the result is defined as the adhesion amount of Zr.

In addition, there is no problem if the zirconium oxide contains any element like Fe, Ni, Cr, Ca, P, Na, Mg, Al, Si, P, and F. The zirconium oxide containing these elements may be, for example, a composite oxide containing zirconium as a main component.

That is, the zirconium oxide is a substance mainly composed of zirconium and oxygen and represented by, for example, a chemical formula of $ZrO_2$. Moreover, the zirconium oxide may contain Por F as a solid solution or may contain Por F substituted with a part of oxygen. Further, as described above, Fe, Ni, Cr, Ca, P, Na, Mg, Al, and Si may be solid-solved or substituted. The presence of zirconium oxide can be confirmed by the appearance of a peak of $Zr3d_{5/2}$ in the range of 182.3±0.5 eV when X-ray photoelectron spectroscopy (XPS) is performed on the film layer. Furthermore, P and F may be contained in the zirconium oxide and also contained in the film.

The composition of the tin sulfide is not particularly limited, and examples thereof include SnS, $SnS_2$, and $Sn_2S_3$. The adhesion amount of tin sulfide needs to be 0.1 mg/m$^2$ or more and 5 mg/m$^2$ or less in terms of the amount of sulfur. When the adhesion amount is less than 0.1 mg/m$^2$ in terms of the amount of sulfur, the improvement in yellowing resistance is insufficient, and when the adhesion amount is more than 5 mg/m$^2$ in terms of the amount of sulfur, conversely, the external appearance changes depending on the color of the tin sulfide itself, which is not preferable. For example, SnS is gray-black and $SnS_2$ and $Sn_2S_3$ are yellow, and thus, if the amount thereof is excessive, the external appearance becomes blackish or yellowish. A more preferable range is 0.2 mg/m$^2$ or more and 3 mg/m$^2$ or less. In addition, from the viewpoint of improving yellowing resistance, SnS in which the color of tin sulfide itself is not yellowish like $SnS_2$ and $Sn_2S_3$ is preferable as the tin sulfide.

For the amount of sulfur, X-ray fluorescence measurement is performed on the tin-plated steel sheet having the film layer according to the present embodiment formed on the surface, and the value obtained from the result is defined as the amount of sulfur.

When the adhesion amount of Zr and the amount of sulfur in the film layer are measured by fluorescent X-ray spectroscopy, the fluorescent X-rays used for the measurement are a primary ray of ZrαK (wavelength 0.0787 nm) and a primary ray of SαK (wavelength 0.537 nm). The target of the X-ray tube is Rh, and the tube voltage and tube current are appropriate values in the range of 30 to 40 kV and 80 to 100 mA, respectively. For the slit width, the dispersive crystal, and the detector, conditions suitable for the resolution of the fluorescent X-ray to be measured, and the ranges of the Zr adhesion amount and the amount of sulfur are selected. Also, a calibration curve is prepared by the fluorescent X-ray intensity from a test piece in which the adhesion amount of Zr and the amount of sulfur are known. Then, the film layer to be measured is irradiated with X-rays according to the set conditions, and the fluorescent X-ray intensity is measured. Subsequently, the adhesion amount of Zr and the amount of sulfur in the film layer are determined from the fluorescent X-ray intensity by the calibration curve. In addition, the measurement points are circular areas with a diameter of 30 mm on the surface of the film layer, measurement is performed at arbitrary 5 measurement points on the surface of the film layer, and an arithmetic average value thereof is taken as the measurement result.

As shown in FIG. 1, the film layer containing zirconium oxide and tin sulfide may be formed in layers as film layers. In the example shown in FIG. 1, a layer containing zirconium oxide is present on the tin-based plating layer, and a layer containing tin sulfide is further present thereon.

Also, as shown in FIG. 2, the film layer may be formed by dispersing and mixing zirconium oxide and tin sulfide. In the example shown in FIG. 2, zirconium oxide constitutes a matrix of the film layer, and tin sulfide is dispersed in the matrix.

Further, as shown in FIG. 3, the film layer may be formed by dispersing and mixing zirconium oxide and tin sulfide, and a layer containing tin sulfide may be formed on the surface layer side of the film layer. In the example shown in FIG. 3, zirconium oxide constitutes a matrix of the film layer, tin sulfide is dispersed in the matrix, and a layer containing tin sulfide is present on the surface layer.

In the present embodiment, as shown in FIGS. 1, 2, and 3, sulfide staining resistance and yellowing resistance can be improved regardless of the presence state of zirconium oxide and tin sulfide. In the case of the form shown in FIG. 1, since a layered tin sulfide is present on the surface layer side of the film layer, for example, when the tin-plated steel sheet of the present embodiment is used as a structural material for a can, even if sulfur(S) is generated from a food filled in the can, the layered tin sulfide serves as a barrier, and a layer formed of zirconium oxide also exerts a barrier effect against the penetration of sulfur(S), so that sulfur cannot penetrate into the tin-based plating layer side, and formation of new tin sulfide is suppressed, and thus sulfide staining resistance can be improved.

In addition, in the case of the form shown in FIG. 2, since tin sulfide is present together with zirconium oxide inside the film layer, for example, even when cracks are generated in the film layer when the tin-plated steel sheet of the present embodiment is formed into a can and sulfur(S) is generated from a food filled in the can in a state where the cracks are left as they are, further formation of tin sulfide is suppressed since almost all tin (Sn) contained in the film layer has been changed to tin sulfide, and thus sulfide staining resistance can be improved.

Furthermore, in the case of the form shown in FIG. 3, since the effects of the forms shown in FIGS. 1 and 2 are both exerted, even if sulfur(S) is generated from a food stored in a can, formation of new tin sulfide is suppressed, and thus sulfide staining resistance can be improved.

Also, in any form of FIGS. 1 to 3, since the tin-based plating layer is coated on the film layer, formation of tin oxide is suppressed on the surface of the tin-based plating layer, and thus yellowing resistance can be improved.

Whether the film layer of the present embodiment is in the form of any one of FIGS. 1 to 3 can be confirmed by observation with a transmission electron microscope. Specifically, a thin film sample of the film layer is prepared by a microtome method so that the cross section of the tin-plated steel sheet of the present embodiment can be observed. In a region of 100 nm×100 nm (a region having a film thickness of 100 nm in a direction parallel to a sheet width direction and a film thickness of 100 nm in a sheet thickness direction) of the obtained thin film sample, at least five regions are observed at a magnification of 1 million times using a 200 kV field emission transmission electron microscope (FE-TEM), and element mapping is performed using an energy dispersive X-ray analyzer (EDS). From the element mapping result, existing regions of Sn, Zr, and S are confirmed. When Sn and S are detected at the same position, tin sulfide is present at that position. In addition, zirconium oxide is present in a region where Zr is detected. In this way, by confirming the existence positions of tin sulfide and zirconium oxide, it is possible to confirm which form of FIGS. 1 to 3 the film layer is.

When the sheet width direction of the thin film sample cannot be uniquely determined, it may be determined as follows. The sheet width direction of the thin film sample is a sheet width direction of the steel sheet before the thin film sample is prepared, and is a direction orthogonal to a rolling direction and the sheet thickness direction. The rolling direction is a direction parallel to an extending direction of grains in a metallographic structure of the steel sheet. The extending direction of grains is a direction parallel to a major axis direction of grains. Since the major axis directions of all grains do not necessarily face completely the same direction and there may be some variation, for example, five grains are arbitrarily selected by image analysis of an electron microscope, a major axis direction of each grain is obtained, a unit vector in each major axis direction is obtained, a sum of the unit vectors is defined as a composite vector, a direction of the composite vector is defined as a major axis direction of grains, and a direction parallel thereto is defined as a rolling direction.

Moreover, the tin-plated steel sheet according to the present embodiment may have a tin-based plating layer and a film layer on at least one surface of the steel sheet. The other surface of the steel sheet may have either one or both of a tin-based plating layer and a film layer, or may not have both of a tin-based plating layer and a film layer. Further, the tin-plated steel sheet may have a tin-based plating layer and a film layer on both surfaces of the steel sheet. Furthermore, the tin-plated steel sheet according to the present embodiment may have a layer or a film composed of other components on the other surface.

<2. Can>

Figure 4:
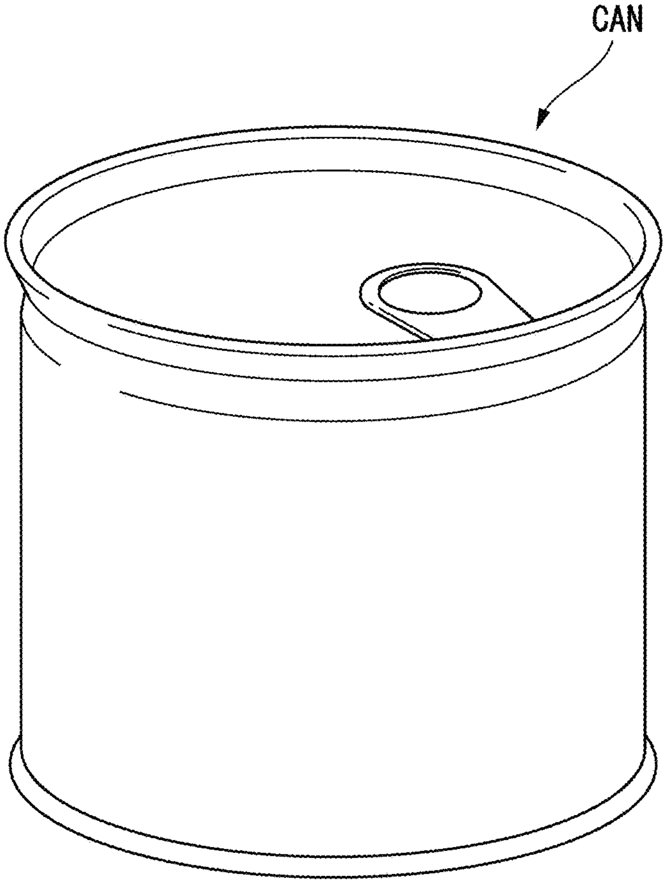
FIG. 4 is a perspective view illustrating an example of a can according to an embodiment of the present invention.

As an example, the tin-plated steel sheet of the present embodiment can be used as a material of a can. FIG. 4 illustrates, as an example of the can, a DR can that can be used for storing food. The can manufactured using the tin-plated steel sheet of the present embodiment as a material can be used as a food can or a beverage can, an oil or a paint can, or the like, and the use thereof is not particularly limited. The method for manufacturing the can is not particularly limited, and a general method may be used. For example, in the case of a 3-piece can, the tin-plated steel sheet of the present embodiment is cut into a predetermined shape, and then the cut tin-plated steel sheet is rolled into a cylindrical shape and both ends thereof are welded to manufacture a can body portion. In addition, a bottom lid portion and a canopy portion are manufactured by punching the tin-plated steel sheet into a predetermined shape. Then, one of the bottom lid portion and the canopy portion is wound and joined to the can body portion, contents such as food are filled in the can, and then the other of the bottom lid portion and the canopy portion is wound and joined to the can body portion, thereby manufacturing a can storing the food. At this time, a film portion according to the present embodiment is disposed at least on the inner surface side of the can body portion, the bottom lid portion, and the canopy portion. Of course, the film portion according to the present embodiment may be further disposed on the outer surface side.

The can according to the present embodiment is formed of the tin-plated steel sheet of the present embodiment, and the tin-plated steel sheet is excellent in sulfide staining resistance and yellowing resistance, so that it is possible to reduce concerns on food hygiene.

The tin-plated steel sheet according to the present embodiment may be manufactured by any method, but can be manufactured, for example, by a method for manufacturing a tin-plated steel sheet described below.

<3. Method for Manufacturing Tin-Plated Steel Sheet>

An example of the method for manufacturing a tin-plated steel sheet according to the present embodiment will be described. In the method for manufacturing a tin-plated steel sheet according to the present embodiment, a tin-plated steel sheet is manufactured by immersing a steel sheet having a tin-based plating layer on at least one surface in a solution containing zirconium ions or subjecting the steel sheet to a first cathode electrolysis treatment in a solution containing zirconium ions to form zirconium oxide on the tin-based plating layer, and then subjecting the steel sheet on which the zirconium oxide has been formed to a second cathode electrolysis treatment in an electrolyte solution containing sulfur(S).

In the present embodiment, prior to the first and second cathode electrolysis treatments, a steel sheet is prepared, and a tin-based plating layer is formed on at least one surface of the steel sheet by tin plating.

(3.1 Preparation of Steel Sheet)

First, a steel sheet to be a base metal of a tin-plated steel sheet is prepared. The manufacturing method and material of the steel sheet to be used are not particularly limited, and examples thereof include those manufactured through steps such as casting, hot rolling, pickling, cold rolling, annealing, and temper rolling. The annealing step may be continuous annealing or batch-type box annealing.

(3.2 Formation of Tin-Based Plating Layer)

Next, a tin-based plating layer is formed on at least one surface of the steel sheet. The method for applying a tin-based plating layer to the sheet surface is not particularly limited, but for example, a known electroplating method is preferable, and a hot-dip plating method that plates a steel sheet by immersing the steel sheet in molten tin may be used.

As the electroplating method, for example, an electrolysis method using a well-known phenolsulfonic acid bath, a halogen bath, an alkali bath, or the like can be used. If necessary, the steel sheet may be subjected to a cleaning treatment such as degreasing or pickling before forming a tin-based plating layer. The method may be any method as long as the method can remove oil, oxides, and other foreign matters on the sheet surface. Examples thereof include chemical treatments such as degreasing followed by pickling, and mechanical treatments such as shot blasting, sand blasting, grit blasting, and dry ice blasting. There is no problem even if these chemical treatments and mechanical treatments are combined.

As the degreasing, for example, cathode electrolytic degreasing or anode electrolytic degreasing for 0.2 to 5 seconds at 20 to 80° C. and a current density of 5 to 40 A/dm$^2$ in an aqueous sodium hydroxide solution having a concentration of 10 to 50 g/L can be applied.

In the pickling, other than the pickling treatment of only immersing the steel sheet in an electroless manner, the method may be any method such as cathode electrolytic pickling or anode electrolytic pickling having a high cleaning action on the sheet surface. From the viewpoint of industrial production, cathode electrolytic pickling has a high cleaning action on the sheet surface and is less likely to cause overpickling, and thus is common and preferable. For example, cathode electrolytic pickling at an energization amount of 5 to 50 C/dm$^2$ can be applied in a pickling bath with a sulfuric acid concentration of 5 to 40% at a temperature of 30 to 90° C.

The method for applying a tin-based plating layer to the sheet surface is not particularly limited, but a known electroplating method is preferable. As the electroplating method, for example, an electrolysis method using an acidic bath such as a well-known sulfuric acid bath, a fluoroborate bath, a phenol sulfonic acid bath, or a methane sulfonic acid bath, an alkali bath, or the like can be used.

In addition, a hot-dip plating method that forms a tin-based plating layer by immersing a steel sheet in a molten Sn plating bath may be used.

After the tin plating, the steel sheet provided with a tin-based plating layer may be subjected to a heating and melting treatment in which the steel sheet is heated to 231.9° C. or higher, which is the melting point of tin. By this heating and melting treatment, gloss is obtained on the surface of the tin-plated steel sheet, and an iron-tin alloy layer which is an alloy layer of tin and Fe is formed between the tin-based plating layer and the steel sheet, so that corrosion resistance is further improved.

(3.3 Cathode Electrolysis Treatment)

Hereinafter, a method for forming a film layer containing zirconium oxide and tin sulfide according to the present embodiment will be described.

[First Cathode Electrolysis Treatment]

In order to form the film layer according to the present embodiment, first, a film containing zirconium oxide is formed on a tin-based plating layer formed on a steel sheet.

The film containing zirconium oxide can be formed on a tin-based plating layer by immersing a steel sheet having a tin-based plating layer in a solution containing zirconium ions or performing a first cathode electrolysis treatment on the steel sheet having a tin-based plating layer in a solution containing zirconium ions.

In addition to the cathode electrolysis treatment, it is also conceivable to form a film by immersion treatment. However, in the immersion treatment, since the surface of the tin-based plating layer is etched to form a film containing zirconium oxide, the adhesion amount thereof tends to be uneven, and the treatment time is also long, which is disadvantageous in industrial production as compared with the cathode electrolysis treatment.

In the cathode electrolysis treatment, a uniform film can be obtained in combination with forced charge transfer, surface cleaning by hydrogen generation at the interface between the tin plating layer and the electrolyte, and adhesion promoting effect by pH increase. Further, in the first cathode electrolysis treatment, nitrate ions and ammonium ions coexist in the treatment liquid, so that the treatment can be performed for a short time of about several seconds to several ten seconds, which is industrially extremely advantageous. Therefore, it is preferable to use a method by cathode electrolysis for the formation of the film containing zirconium oxide according to the present embodiment.

The concentration of zirconium ions in the solution for performing the first cathode electrolysis treatment (hereinafter, referred to as the catholyte) may be appropriately adjusted according to the production facility and the production speed (capacity), and for example, the zirconium ion concentration is preferably 100 ppm or more and 4000 ppm or less. Also, the catholyte containing zirconium ions may contain other components such as fluorine ions, ammonium ions, nitrate ions, sulfate ions, and phosphate ions.

Here, the liquid temperature of the catholyte is not particularly limited, but is preferably, for example, in a range of 10° C. or higher and 50° C. or lower. By performing cathode electrolysis at 50° C. or lower, it is possible to form a dense and uniform film structure composed of very fine particles. In addition, by setting the liquid temperature of the catholyte to 50° C. or lower, it is possible to prevent occurrence of defects, cracks, microcracks and the like in the structure of the film of zirconium oxide to be formed and to prevent reduction of coating film adhesion. Moreover, by setting the liquid temperature of the catholyte to 10° C. or higher, the film formation efficiency can be improved, and cooling of the solution can be made unnecessary even when the outside temperature is high, which is economical.

Further, the pH of the catholyte is not particularly limited, but is preferably 3.0 or more and 5.0 or less. When the pH is 3.0 or more, the production efficiency of zirconium oxide can be excellent, and when the pH is 5.0 or less, a large amount of precipitation of, for example, a hydroxide of zirconium is prevented from occurring in the catholyte, so that continuous productivity can be improved.

In order to adjust the pH of the catholyte or to increase the electrolysis efficiency, for example, nitric acid, ammonia water, or the like may be added to the catholyte.

Furthermore, the current density during the cathode electrolysis is preferably, for example, 0.05 A/dm$^2$ or more and 50 A/dm$^2$ or less. When the current density is 0.05 A/dm$^2$ or more, the production efficiency of zirconium oxide can be sufficiently increased, the film layer containing zirconium oxide can be stably formed, and the sulfide staining resistance and the yellowing resistance can be sufficiently excellent. When the current density is 50 A/dm$^2$ or less, the production efficiency of zirconium oxide can be made moderate, and the production of zirconium oxide which is coarse and inferior in adhesion can be suppressed. A more preferable range of the current density is 1 A/dm$^2$ or more and 10 A/dm$^2$ or less.

In the formation of the film containing zirconium oxide, the time for cathode electrolysis may be appropriately adjusted according to the current density with respect to the target Zr adhesion amount. Specifically, the cathode electrolysis time may be in the range of 0.4 to 5 seconds.

For example, distilled water or the like can be used as the solvent of the solution used for cathode electrolysis, but the solvent is not limited to water such as distilled water, and can be appropriately selected according to a material to be melted, a production method, and the like.

As the zirconium during the cathode electrolysis, for example, a zirconium complex like $H_2ZrF_6$ can be used as a supply source of zirconium. Zr in the Zr complex as described above is present in the catholyte as $Zr^{4+}$ due to an increase in pH at the cathode electrode interface. Such Zr ions further react in the catholyte to form zirconium oxide. When phosphoric acid is contained in the electrolyte, zirconium phosphate is also produced.

In addition, there is no problem whether the energization pattern during the cathode electrolysis is continuous energization or intermittent energization.

During the cathode electrolysis, the relative flow velocity between the catholyte and the steel sheet is preferably 50 m/min or more. When the relative flow velocity is 50 m/min or more, it is easy to make uniform the pH of the sheet surface due to hydrogen generation during energization, and it is possible to suppress production of coarse zirconium oxide. The upper limit of the relative flow velocity is not particularly limited. Also, the relative flow velocity between the catholyte and the steel sheet is a speed difference between the flow velocity of the catholyte and the sheet passing speed of the steel sheet. When the catholyte is a stationary bath, that is, when the flow velocity of the catholyte is 0 m/min, the relative flow velocity is the sheet passing speed of the steel sheet.

[Second Cathode Electrolysis Treatment]

The film layer containing zirconium oxide and tin sulfide according to the present embodiment is obtained by subjecting a steel sheet in which the film containing zirconium oxide is formed on the tin-based plating layer to a second cathode electrolysis treatment in an electrolyte solution containing sulfur. The electrolyte solution to be used is not particularly limited as to specific components, but examples thereof include an aqueous sodium thiosulfate solution containing sodium thiosulfate as an electrolyte.

The concentration of sodium thiosulfate is also not particularly limited, but is preferably 10 to 40 g/L as sodium thiosulfate, for example. The electrolysis conditions are not also particularly limited, but a solution temperature of 30 to 60° C. and an energization amount of 0.5 to 10 C/dm$^2$ are preferable. The current value and the electrolysis time are not particularly limited as long as the above energization amount range is satisfied. More preferable conditions are a sodium thiosulfate concentration of 20 to 30 g/L, a solution temperature of 40 to 50° C., and an energization amount of 1 to 5 C/dm$^2$. Within these ranges, tin sulfide is efficiently formed, and is industrially suitable. The Sn source of tin sulfide formed by the second cathode electrolysis treatment is Sn contained in the tin-based plating layer.

As a solvent of the solution used for cathode electrolysis, for example, distilled water or the like can be used, but it is not limited to water such as distilled water. In addition, there is no problem whether the energization pattern during the cathode electrolysis is continuous energization or intermittent energization.

By appropriately adjusting the conditions of the second cathode electrolysis treatment including the electrolysis time, the film layer can be separately formed into the forms shown in FIGS. 1 to 3.

By setting the concentration of sodium thiosulfate in the solution, the temperature of the solution and the energization amount to the above ranges and further setting the electrolysis time to 2.0 seconds or less, a film layer in which zirconium oxide and tin sulfide are dispersed and mixed as shown in FIG. 2 can be formed. This is presumed to be because the electrolysis time is as short as 2.0 seconds or less, so that the precipitation amount of tin sulfide is relatively small, and tin sulfide is mainly formed inside the film layer, and thus a film layer in which zirconium oxide and tin sulfide are dispersed and mixed is obtained. The lower limit of the electrolysis time is preferably 0.4 seconds or more in order to make the adhesion amount of tin sulfide sufficient.

Also, by setting the concentration of sodium thiosulfate in the solution, the temperature of the solution and the energization amount to the above ranges and further setting the electrolysis time to more than 2.0 seconds, it is possible to form a film layer in which zirconium oxide and tin sulfide are dispersed and mixed, and a tin sulfide layer is formed on the surface layer side as shown in FIG. 3. This is presumed to be because the electrolysis time is as long as more than 2.0 seconds, so that tin sulfide is formed not only inside the film layer but also on the surface of the film layer, and thus a film layer in which zirconium oxide and tin sulfide are dispersed and mixed in the film layer, and a tin sulfide layer is formed on the surface layer is obtained. The upper limit of the electrolysis time is preferably 10 seconds or less in order to prevent the adhesion amount of tin sulfide from becoming excessive.

Further, by setting the concentration of sodium thiosulfate in the solution to a high concentration of 55 to 70 g/L, and setting the electrolysis time to 0.8 seconds or less while keeping the temperature of the solution and the energization amount in the above ranges, a film layer in which a layer made of zirconium oxide and a layer made of tin sulfide are laminated as shown in FIG. 1 can be formed. This is presumed to be because by setting the concentration of sodium thiosulfate to a high concentration and setting the electrolysis time to 0.8 seconds or less, tin sulfide is formed only on the surface of the film layer, and thus a film layer in which a layer made of zirconium oxide and a layer made of tin sulfide are laminated is obtained. The lower limit of the electrolysis time is preferably 0.4 seconds or more in order to make the adhesion amount of tin sulfide sufficient.

As described above, the tin-plated steel sheet of the present embodiment can be manufactured.

EXAMPLES

Subsequently, a tin-plated steel sheet and a method for manufacturing a tin-plated steel sheet according to the present invention will be specifically described with reference to Examples and Comparative Examples. The following examples are merely examples of the tin-plated steel sheet and the method for manufacturing a tin-plated steel sheet according to the present invention, and the tin-plated steel sheet and the method for manufacturing a tin-plated steel sheet according to the present invention are not limited to the following examples.

<Test Material>

A low carbon cold-rolled steel sheet having a sheet thickness of 0.2 mm was subjected to electrolytic alkali degreasing, water washing, dilute sulfuric acid electrolytic pickling, and water washing as pretreatment, then subjected to electro tin plating using a phenol sulfonic acid bath, and then further subjected to heating and melting treatment. The adhesion amount of the tin plating layer was based on about 2.8 g/m$^2$ per one surface as the amount of metal tin, but in some test materials, the adhesion amount of the tin plating layer was changed by changing the energization time. In addition, a test material not subjected to heating and melting treatment after electro tin plating was also prepared. An example in which heating and melting were not performed is No. A18 in Table 1 (B18 in Table 2). The adhesion amount of the tin plating layer was specified by measurement by a fluorescent X-ray method (ZSX Primus manufactured by Rigaku Corporation). The measurement conditions were as described above.

The steel sheet having the tin plating layer prepared as described above was subjected to cathode electrolysis in an aqueous solution containing zirconium fluoride (first cathode electrolysis treatment) to form a zirconium oxide layer on the tin plating layer. The current density, flow velocity, pH, and bath temperature were appropriately changed.

Furthermore, the tin-plated steel sheet on which the zirconium oxide layer had been formed was subjected to cathode electrolysis in a 5 to 70 g/L aqueous sodium thiosulfate solution (second cathode electrolysis treatment) to form tin sulfide. The bath temperature was set to 20 to 65° C., and the quantity of electricity in the cathode electrolysis was set to 0 to 15 C/dm$^2$. No. a1 in Table 1 (No. b1 in Table 2) was not subjected to cathode electrolysis and was subjected to immersion treatment.

The conditions of the first cathode electrolysis treatment and the second cathode electrolysis treatment are shown in Table 1.

TABLE 1

| | First cathode electrolysis treatment | | | | | | Second cathode electrolysis treatment | | | | |
|---|---|---|---|---|---|---|---|---|---|---|---|
| | Solution | | | Cathode electrolysis | | Relative flow velocity between | Solution | | Cathode electrolysis | | |
| Manufacturing method No. | Zirconium ion concentration (ppm) | Temperature (° C.) | pH (—) | Current density (A/dm²) | Time (sec) | solution – steel sheet (m/min) | Sodium thiosulfate (g/L) | Temperature (° C.) | Energization amount (C/dm²) | Time (sec) | Remark |
| A1 | 130 | 35 | 4.0 | 5 | 1 | 200 | 25 | 45 | 5 | 2 | |
| A2 | 3800 | 35 | 4.0 | 5 | 1 | 200 | 25 | 45 | 5 | 2 | |
| A3 | 1500 | 10 | 4.0 | 5 | 1 | 200 | 25 | 45 | 5 | 2 | |
| A4 | 1500 | 50 | 4.0 | 5 | 1 | 200 | 25 | 45 | 5 | 2 | |
| A5 | 1500 | 35 | 3.0 | 5 | 1 | 200 | 25 | 45 | 5 | 2 | |
| A6 | 1500 | 35 | 5.0 | 5 | 1 | 200 | 25 | 45 | 5 | 2 | |
| A7 | 1500 | 35 | 4.0 | 0.05 | 1 | 200 | 25 | 45 | 5 | 2 | |
| A8 | 1500 | 35 | 4.0 | 50 | 1 | 200 | 25 | 45 | 5 | 2 | |
| A9 | 1500 | 35 | 4.0 | 5 | 1 | 400 | 25 | 45 | 5 | 2 | |
| A10 | 1500 | 35 | 4.0 | 5 | 1 | 200 | 10 | 45 | 5 | 2 | |
| A11 | 1500 | 35 | 4.0 | 5 | 1 | 200 | 40 | 45 | 5 | 2 | |
| A12 | 1500 | 35 | 4.0 | 5 | 1 | 200 | 25 | 30 | 5 | 2 | |
| A13 | 1500 | 35 | 4.0 | 5 | 1 | 200 | 25 | 60 | 5 | 2 | |
| A14 | 1500 | 35 | 4.0 | 5 | 1 | 200 | 25 | 45 | 0.5 | 2 | |
| A15 | 1500 | 35 | 4.0 | 5 | 1 | 200 | 25 | 45 | 10 | 2 | |
| A16 | 1500 | 35 | 4.0 | 10 | 1 | 200 | 25 | 45 | 5 | 2 | |
| A17 | 1500 | 35 | 4.0 | 10 | 1 | 200 | 25 | 45 | 5 | 2 | |
| A18 | 1500 | 35 | 4.0 | 10 | 1 | 200 | 25 | 45 | 5 | 2 | No heating and melting of tin plating |
| A19 | 1500 | 35 | 4.0 | 5 | 1 | 200 | 25 | 45 | 5 | 3 | |
| A20 | 1500 | 35 | 4.0 | 5 | 1 | 200 | 35 | 45 | 5 | 4 | |
| A21 | 1500 | 35 | 4.0 | 5 | 1 | 200 | 25 | 45 | 10 | 10 | |
| A22 | 1500 | 35 | 4.0 | 5 | 1 | 200 | 55 | 60 | 5 | 0.8 | |
| A23 | 1500 | 35 | 4.0 | 5 | 1 | 200 | 70 | 60 | 5 | 0.4 | |
| a1 | 3800 | 35 | 4.0 | 5 | 1 | 200 | 25 | 45 | 0 | 2* | *Immersion time |
| a2 | 95 | 35 | 4.0 | 5 | 1 | 200 | 25 | 45 | 5 | 2 | |
| a3 | 4500 | 35 | 4.0 | 10 | 3 | 200 | 25 | 45 | 5 | 2 | |
| a4 | 1500 | 5 | 4.0 | 5 | 1 | 200 | 25 | 45 | 5 | 2 | |
| a5 | 1500 | 55 | 4.0 | 5 | 1 | 200 | 25 | 45 | 5 | 2 | |
| a6 | 1500 | 35 | 2.5 | 1 | 1 | 200 | 25 | 45 | 5 | 2 | |
| a7 | 1500 | 35 | 5.5 | 1 | 1 | 200 | 25 | 45 | 5 | 2 | |
| a8 | 1500 | 35 | 4.0 | 0.03 | 1 | 200 | 25 | 45 | 5 | 2 | |
| a9 | 1500 | 35 | 4.0 | 54 | 1 | 200 | 25 | 45 | 5 | 2 | |
| a10 | 1500 | 35 | 4.0 | 5 | 1 | 45 | 25 | 45 | 5 | 2 | |
| a11 | 1500 | 35 | 4.0 | 5 | 1 | 200 | 5 | 45 | 5 | 2 | |
| a12 | 1500 | 35 | 4.0 | 5 | 1 | 200 | 45 | 45 | 5 | 2 | |
| a13 | 1500 | 35 | 4.0 | 5 | 1 | 200 | 25 | 20 | 5 | 2 | |
| a14 | 1500 | 35 | 4.0 | 5 | 1 | 200 | 25 | 65 | 5 | 2 | |
| a15 | 1500 | 35 | 4.0 | 5 | 1 | 200 | 25 | 45 | 0.3 | 2 | |
| a16 | 1500 | 35 | 4.0 | 5 | 1 | 200 | 25 | 45 | 15 | 2 | |
| a17 | — | — | — | — | — | — | 25 | 45 | 5 | 2 | |
| a18 | — | — | — | — | — | — | 25 | 45 | 10 | 2 | |

The underlined part indicates out of the range of preferable manufacturing conditions.
Cathode electrolysis treatment 2 of No. a1 was immersion treatment of immersion in a sodium thiosulfate solution for 2 seconds.

The tin-plated steel sheet prepared as described above was subjected to the following various evaluations.

[Adhesion Amount]

The Zr adhesion amount and the amount of sulfur per one surface were obtained by a fluorescent X-ray method (ZSX Primus manufactured by Rigaku Corporation). The measurement conditions were as described above.

[Structure of Tin Sulfide]

The peak positions of the binding energies of $Sn3d_{5/2}$ and $S2p_{3/2}$ were examined by an XPS apparatus (PHI Quantera SXM manufactured by ULVAC-PHI). In the determination of the peak positions, the entire spectrum was shifted so that the peak position of carbon (C1s) detected on the surface of the sample was 284.8 eV, and then the binding energy positions of $Sn3d_{5/2}$ and $S2p_{3/2}$ were determined.

When the peak position of $Sn3d_{5/2}$ satisfied the range of 485.4 to 485.9 eV and the peak position of $S2p_{3/2}$ satisfied the range of 160.1 to 163.9 eV, the tin sulfide was determined as SnS.

Also, when the peak position of $Sn3d_{5/2}$ satisfied the range of more than 485.9 and 486.4 eV and the peak position of $S2p_{3/2}$ satisfied the range of 160.1 to 163.9 eV, the tin sulfide was determined as $Sn_2S_3$.

Further, when the peak position of $Sn3d_{5/2}$ satisfied the range of more than 486.4 and 487.9 eV and the peak position of $S2p_{3/2}$ satisfied the range of 160.1 to 163.9 eV, the tin sulfide was determined as $SnS_2$.

[Yellowing Resistance]

A wet test was performed in which the tin-plated steel sheet prepared by the method described in <Test material> was placed in a thermo-hygrostat maintained at 40° C. and a relative humidity of 80% for 4 weeks, and the amount of change Δb* in the color difference b* value before and after the wet test was determined to evaluate the yellowing resistance.

The yellowing resistance was evaluated as Excellent (E) in a case where the Δb* value was 1 or less, Very Good (VG) in a case where the b* value was more than 1 and 2 or less, Good (G) in a case where the b* value was more than 2 and 3 or less, and Poor (P) in a case where the b* value was more than 3, and evaluations E, VG, and G were regarded as acceptable. Also, even when the value of Δb* was 2 or less, evaluation G was given when the b* value before the wet test (initial) was 6 or more.

The b* value was measured using SC-GV5 manufactured by Suga Test Instruments Co., Ltd., which is a commercially available color difference meter. The measurement conditions of b* were a light source C, total reflection, and a measurement diameter of 30 mm.

[Coating Film Adhesion]

Coating film adhesion was evaluated as follows.

The tin-plated steel sheet prepared by the method described in <Test material> was subjected to a wet test by the method described in [Yellowing resistance], and then a commercially available epoxy resin coating material for cans was applied onto the surface in an amount of 7 g/m$^2$ in dry mass, baked at 200° C. for 10 minutes, and placed at room temperature for 24 hours to form a coating film. Thereafter, the tin-plated steel sheet on which the coating film had been formed was subjected to a cross-cut test. In the cross-cut test, a grid pattern cutting reaching the surface of the steel sheet was formed on the coating film, an adhesive tape was attached to the grid pattern portion, the adhesive tape was peeled off within 5 minutes, and the state of peeling of the coating film was evaluated. The grid pattern cutting was formed by making seven linear scratches in each of the longitudinal direction and the lateral direction at intervals of 3 mm using a cutting tool with a blade. The relative angles of the cutting in the longitudinal direction and the lateral direction were set to 90°.

After the tape was peeled off, the coating film adhesion was evaluated as Excellent (E) in a case where the coating film (test surface) of the grid pattern portion (test surface) was not peeled off at all, Very Good (VG) in a case where 10 area % or less of the coating film of the test surface was peeled off, Good (G) in a case where more than 10 area % and 20 area % or less of the coating film of the test surface was peeled off, and Poor (P) in a case where more than 20 area % of the coating film of the test surface was peeled off, and evaluations E, VG, and G were regarded as acceptable, and evaluation P was regarded as unacceptable.

[Sulfide Staining Resistance]

The sulfide staining resistance was evaluated as follows.

A commercially available epoxy resin coating material for cans was applied in an amount of 7 g/m$^2$ in dry mass onto the surface of the tin-plated steel sheet prepared by the method described in [Yellowing resistance] and subjected to a wet test, and then baked at 200° C. for 10 minutes and placed at room temperature for 24 hours to form a coating film. Thereafter, the tin-plated steel sheet on which the coating film had been formed was cut to a predetermined size, and this was immersed in an aqueous solution containing 0.3% of sodium dihydrogen phosphate, 0.7% of sodium hydrogen phosphate, and 0.6% of L-cysteine hydrochloride, respectively, and subjected to a retort treatment at 121° C. for 60 minutes in a sealed container. Evaluation was made from the external appearance after the retort treatment.

The sulfide staining resistance was evaluated as Excellent (E) in a case where no blackening was observed on the test surface before and after the test, Very Good (VG) in a case where blackening was observed in a region of 5% or less of the test surface, Good (G) in a case where blackening was observed in a region of more than 5% and 10% or less of the test surface, and Poor (P) in a case where blackening was observed in a region of more than 10% of the test surface, and evaluations E, VG, and G were regarded as acceptable, and evaluation P was regarded as unacceptable.

[Corrosion Resistance after Coating]

The corrosion resistance after coating was evaluated as follows.

A commercially available epoxy resin coating material for cans was applied in an amount of 7 g/m$^2$ in dry mass onto the surface of the tin-plated steel sheet prepared by the method described in [Yellowing resistance] and subjected to a wet test, and then baked at 200° C. for 10 minutes and placed at room temperature for 24 hours to form a coating film. Thereafter, the tin-plated steel sheet after formation of the coating film was cut to a predetermined size, and the presence or absence of generation of rust after immersion in commercially available tomato juice at 60° C. for 7 days was visually evaluated.

The corrosion resistance after coating was evaluated as Excellent (E) in a case where no rust was observed, Very Good (VG) in a case where rust was observed in a region of 5% or less of the test surface, and Poor (P) in a case where rust was observed in a region of more than 5% of the test surface, and evaluations E and G were regarded as acceptable, and evaluation P was regarded as unacceptable.

Table 2 shows investigation results of the tin adhesion amount of the tin-based plating layer of the tin-plated steel sheet obtained under the manufacturing conditions of Table 1, the zirconium adhesion amount of the film layer, the sulfur adhesion amount, the structure of tin sulfide, and various performances.

As is clear from Table 2, B1 to B23, which are within the scope of the present invention, were good in all performances. In particular, B16, B17, and B19 to B21 in which the zirconium adhesion amount is 1.0 to 10 mg/m$^2$, the sulfur adhesion amount is 0.2 to 3 mg/m$^2$, and the structure of the tin sulfide is SnS were particularly excellent in all performances.

In addition, as a result of observation with a transmission-type electron microscope, the form of the films of B1 to 18 was found to be the form shown in FIG. 2. The form of the films of B19 to B21 was found to be the form shown in FIG. 3. The form of the films of B22 and B23 was found to be the form shown in FIG. 1.

On the other hand, it is found that Comparative Examples b1 to b18 in which at least one of the zirconium adhesion amount and the sulfur adhesion amount is out of the scope of the present invention are inferior in any of yellowing resistance, coating film adhesion, sulfide staining resistance, and corrosion resistance after coating.

In b1, the Sn adhesion amount of the tin-based plating layer was small, the energization amount in the second cathode electrolysis treatment was set to 0 C/dm$^2$, and the immersion treatment was performed instead of the second cathode electrolysis treatment 2. Therefore, SnS did not precipitate on the film layer, and the yellowing resistance, the coating adhesion, the sulfide staining resistance, and the corrosion resistance after coating were insufficient.

In b2, the zirconium ion concentration in the first cathode electrolysis treatment was low, the amount of metal Zr in the film layer was small, and the yellowing resistance, the sulfide staining resistance, and the corrosion resistance after coating were insufficient.

In b3, the zirconium ion concentration in the first cathode electrolysis treatment was excessive, the amount of metal Zr in the film layer was excessive, and the coating adhesion was insufficient.

In b4, the liquid temperature in the first cathode electrolysis treatment was low, the amount of metal Zr in the film layer was small, and the yellowing resistance, the sulfide staining resistance, and the corrosion resistance after coating were insufficient.

In b5, the liquid temperature in the first cathode electrolysis treatment was high, the amount of metal Zr in the film layer was excessive, and the yellowing resistance and the coating adhesion were insufficient.

In b6, the pH in the first cathode electrolysis treatment was low, the amount of metal Zr in the film layer was small, and the yellowing resistance, the sulfide staining resistance, and the corrosion resistance after coating were insufficient.

In b7, the pH in the first cathode electrolysis treatment was high, the amount of metal Zr in the film layer was excessive, and the coating adhesion was insufficient.

In b8, the current density in the first cathode electrolysis treatment was low, the amount of metal Zr in the film layer was small, and the yellowing resistance, the sulfide staining resistance, and the corrosion resistance after coating were insufficient.

In b9, the current density in the first cathode electrolysis treatment was high, the amount of metal Zr in the film layer was excessive, and the coating adhesion was insufficient.

In b10, the relative flow velocity in the first cathode electrolysis treatment was low, the amount of metal Zr in the film layer was small, the amount of S was also small, and the yellowing resistance, the sulfide staining resistance, and the corrosion resistance after coating were insufficient.

In b11, the sodium thiosulfate concentration in the second cathode electrolysis treatment was low, the amount of S in the film layer was small, and the yellowing resistance, the sulfide staining resistance, and the corrosion resistance after coating were insufficient.

In b12, since the sodium thiosulfate concentration in the second cathode electrolysis treatment exceeded 40 g/L and the energization time was 2 seconds, the amount of S in the film layer was excessive, and the sulfide staining resistance was insufficient.

In b13, the liquid temperature in the second cathode electrolysis treatment was low, the amount of S in the film layer was small, and the yellowing resistance, the sulfide staining resistance, and the corrosion resistance after coating were insufficient.

In b14, the liquid temperature in the second cathode electrolysis treatment was high, the amount in S in the film layer was excessive, and the sulfide staining resistance was insufficient.

In b15, the energization amount in the second cathode electrolysis treatment was low, the amount of S in the film layer was small, and the yellowing resistance, the sulfide staining resistance, and the corrosion resistance after coating were insufficient.

In b16, the energization amount in the second cathode electrolysis treatment was high, the amount of S in the film layer was excessive, and the sulfide staining resistance was insufficient.

In b17 and b18, since the first cathode electrolysis treatment was not performed, the adhesion amount of zirconium oxide in the film layer was 0 mg/m$^2$ in terms of the amount of metal Zr, and the sulfide staining resistance and the corrosion resistance after coating were insufficient.

TABLE 2

| | | | Tin-based plating layer | Film layer | | | Characteristic evaluation | | | |
|---|---|---|---|---|---|---|---|---|---|---|
| | Reference symbol | Manufacturing method No. | Amount in terms of tin (g/m$^2$) | Amount of metal Zr (mg/m$^2$) | Amount of sulfur (mg/m$^2$) | Structure of tin sulfide | Yellowing resistance | Coating film adhesion | Sulfide staining resistance | Corrosion resistance after coating |
| Invention Example | B1 | A1 | 3.0 | 0.2 | 2.3 | SnS | G | E | G | VG |
| | B2 | A2 | 2.8 | 50.0 | 2.5 | SnS | E | G | E | E |
| | B3 | A3 | 3.0 | 0.5 | 2.5 | SnS | VG | E | G | VG |
| | B4 | A4 | 2.9 | 25.0 | 2.4 | SnS | E | VG | E | E |
| | B5 | A5 | 2.9 | 0.5 | 2.5 | SnS | VG | E | G | VG |
| | B6 | A6 | 3.0 | 30.0 | 2.4 | SnS | E | VG | VG | E |
| | B7 | A7 | 2.9 | 0.2 | 2.5 | SnS | G | E | G | VG |
| | B8 | A8 | 2.7 | 30.0 | 2.9 | SnS | E | VG | E | E |
| | B9 | A9 | 3.0 | 0.5 | 2.6 | SnS | VG | E | G | VG |
| | B10 | A10 | 2.8 | 4.7 | 0.2 | SnS | G | E | G | VG |
| | B11 | A11 | 3.0 | 4.7 | 3.6 | SnS | VG | E | G | VG |
| | B12 | A12 | 3.1 | 4.7 | 0.1 | SnS | G | E | G | VG |
| | B13 | A13 | 3.2 | 4.8 | 4.0 | SnS | VG | E | G | VG |
| | B14 | A14 | 2.7 | 4.7 | 0.2 | SnS | G | E | G | VG |
| | B15 | A15 | 2.8 | 4.7 | 2.5 | $SnS_2$ | VG | E | VG | VG |
| | B16 | A16 | 2.8 | 10.0 | 1.5 | SnS | E | E | E | E |
| | B17 | A17 | 3.0 | 10.0 | 2.8 | SnS | E | E | E | E |
| | B18 | A18 | 2.9 | 9.5 | 2.0 | SnS | VG | VG | VG | VG |
| | B19 | A19 | 2.8 | 4.8 | 2.1 | SnS | E | E | E | E |
| | B20 | A20 | 2.9 | 5.1 | 2.2 | SnS | E | E | E | E |
| | B21 | A21 | 2.9 | 4.7 | 2.3 | SnS | E | E | E | E |
| | B22 | A22 | 2.9 | 4.9 | 2.8 | SnS | E | VG | E | E |
| | B23 | A23 | 2.8 | 5.1 | 0.6 | SnS | E | VG | E | E |
| Comparative Example | b1 | a1 | 0.04 | 4.9 | 2.4 | — | P | P | P | P |
| | b2 | a2 | 2.8 | 0.05 | 2.4 | SnS | P | E | P | P |
| | b3 | a3 | 3.0 | 60.0 | 2.6 | SnS | E | P | E | E |

TABLE 2-continued

| | | Tin-based plating layer | Film layer | | | Characteristic evaluation | | | |
|---|---|---|---|---|---|---|---|---|---|
| Reference symbol | Manufacturing method No. | Amount in terms of tin ($g/m^2$) | Amount of metal Zr ($mg/m^2$) | Amount of sulfur ($mg/m^2$) | Structure of tin sulfide | Yellowing resistance | Coating film adhesion | Sulfide staining resistance | Corrosion resistance after coating |
| b4 | a4 | 3.1 | 0.06 | 2.5 | SnS | P | E | P | P |
| b5 | a5 | 3.2 | 55.0 | 2.6 | SnS | P | P | E | E |
| b6 | a6 | 2.9 | 0.05 | 2.3 | SnS | P | E | P | P |
| b7 | a7 | 2.8 | 52.0 | 2.6 | SnS | E | P | E | E |
| b8 | a8 | 2.8 | 0.1 | 2.5 | SnS | P | E | P | P |
| b9 | a9 | 2.7 | 60.0 | 2.9 | SnS | E | P | E | E |
| b10 | a10 | 3.1 | 0.05 | 0.04 | SnS | P | E | P | P |
| b11 | a11 | 3.0 | 0.5 | 0.04 | SnS | P | E | P | P |
| b12 | a12 | 2.3 | 4.9 | 6.0 | SnS | G | VG | P | VG |
| b13 | a13 | 2.8 | 4.8 | 0.04 | SnS | P | E | P | P |
| b14 | a14 | 2.9 | 4.7 | 6.2 | SnS | G | VG | P | VG |
| b15 | a15 | 3.1 | 4.9 | 0.04 | SnS | P | E | P | P |
| b16 | a16 | 3.0 | 4.5 | 6.3 | SnS | G | VG | P | VG |
| b17 | a17 | 3.1 | 0.0 | 2.0 | SnS | G | G | P | P |
| b18 | a18 | 3.1 | 0.0 | 2.2 | SnS | VG | G | P | P |

The underlined part indicates out of the scope of the present invention.

FIELD OF INDUSTRIAL APPLICATION

According to the present invention, it is possible to provide a tin-plated steel sheet which is more excellent in sulfide staining resistance and yellowing resistance without being subjected to a conventional chromate treatment, and thus has industrial applicability.

The invention claimed is:

1. A tin-plated steel sheet comprising:

a steel sheet;

a tin-based plating layer located on at least one surface of the steel sheet; and a film layer located on the tin-based plating layer and containing zirconium oxide and tin sulfide, wherein an adhesion amount of the tin-based plating layer is 0.1 $g/m^2$ or more and 15 $g/m^2$ or less in terms of the amount of metal Sn, an adhesion amount of the zirconium oxide in the film layer is 0.2 $mg/m^2$ or more and 50 $mg/m^2$ or less in terms of the amount of metal Zr, and an adhesion amount of the tin sulfide is 0.1 $mg/m^2$ or more and 5 $mg/m^2$ or less in terms of the amount of sulfur.

2. The tin-plated steel sheet according to claim 1, wherein the tin sulfide is SnS.

3. A can comprising the tin-plated steel sheet according to claim 1.

4. A can comprising the tin-plated steel sheet according to claim 2.

* * * * *